J. L. CREVELING.
ELECTRIC DISTRIBUTION.
APPLICATION FILED JAN. 15, 1912.
1,244,960.
Patented Oct. 30, 1917.
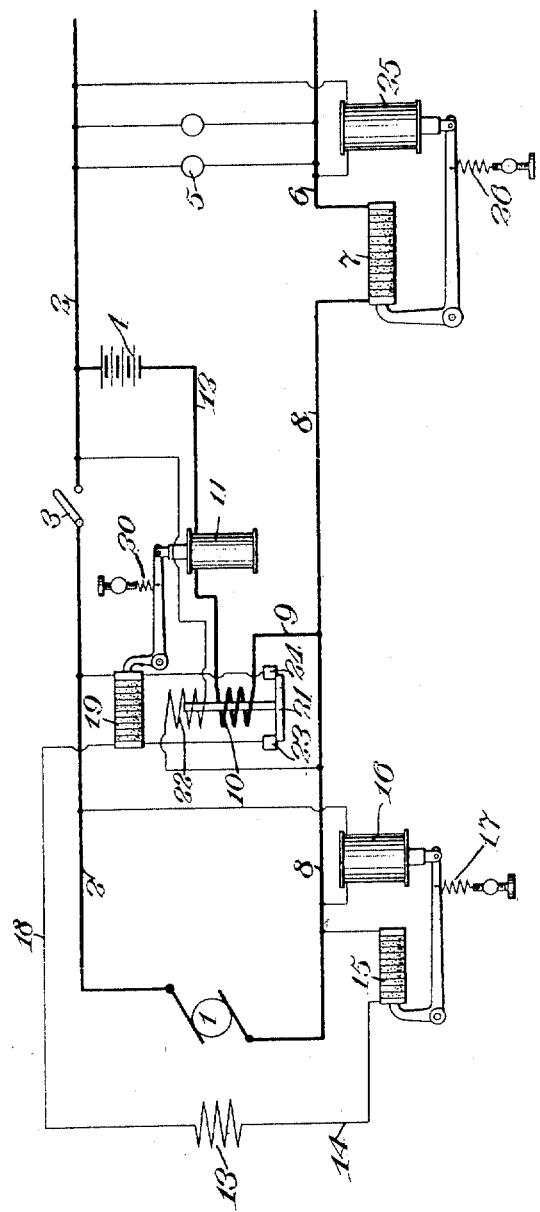
WITNESSES
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC DISTRIBUTION.

1,244,960.      Specification of Letters Patent.      Patented Oct. 30, 1917.

Original application filed August 6, 1909, Serial No. 511,509. Divided and this application filed January 15, 1912. Serial No. 671,167.

*To all whom it may concern:*

Be it known that I, JOHN L. CREVELING, a resident of New York, in the county and State of New York, have invented certain new and useful Improvements in Electric Distribution, as set forth in the annexed specification and drawing forming a part thereof.

My invention pertains to a system of electrical distribution in which a generator is desired to be automatically governed.

My invention has for its particular object to provide means whereby a generator driven at variable speeds may be used to charge a storage battery and automatically governed to charge the same in a predetermined manner and a current regulator for the generator in the battery circuit wherein current supplied by the battery to the lamps or other translating devices does not affect the generator.

This is a division of my application for improvement in electric distribution, Serial No. 511,509, filed August 6th, 1909.

In the drawing there is shown a diagrammatic representation of one type or system of electrical distribution embodying my invention.

In the drawing 1 represents a dynamo or generator from which the lead 2 is carried to the switch 3, from which it continues to one side of the storage battery 4 and lamps or translating devices 5. The lamps or translating devices have their other terminals connected with the main 6 in series with which may be placed a variable resistance 7, the other side of which connects with the main 8 which leads to the opposite brush of the generator. From the main 8 the wire 9 leads to the coil 10 and solenoid 11 from which the wire 12 is led to the remaining terminal of the storage battery 4. 13 represents the field winding of the generator 1 from which the wire 14 is led to a variable resistance indicated at 15, the other side of which is connected to the main 8. The resistance 15 is controlled by the solenoid 16 operating against the action of the adjustable spring 17. The solenoid 16 may be placed in shunt across the mains 2 and 8 as indicated. The opposite terminal of the field coil 13 is led by the wire 18 to the variable resistance 19 which is governed by the solenoid 11 and adjustable spring 20 as will hereinafter more plainly appear. 21 represents a switch which may be of the solenoid variety provided with the coil 10 and the coil 22 which may be in shunt across the mains 2 and 8 as indicated. The switch 21, when closed, completes the connection between the contact members 23 and 24 so as to short circuit the resistance device 19 as shown. The windings of the coils 22 and 10 are such that, when the coil 22 alone is energized, it is not sufficient to close the switch 21 and when current is flowing from the storage battery to line, the said current passing through coil 10 will assist the coil 22 and close the switch 21, but when current flows from the generator into the storage battery the coil 10 will be opposed to the coil 22 and its effect will be still further weakened and, therefore, have little or no tendency to close the switch 21. The solenoid 25, operating against the action of the adjustable spring 26, serves to operate the variable resistance 7 as will hereinafter appear.

The operation of my improvement in electrical distribution is substantially as follows, starting with the various instrumentalities in the position shown in the drawing and the generator at rest:

As the lamp or translation circuit is shown closed, current will flow from the battery 4 to the main 2 through the lamps or translation devices 5, main 6, resistance device 7, main 8, wire 9, coil 10, solenoid 11, wire 12 to the battery, also from the battery through the coil 22. This current, together with that in the coil 10, will cause the switch 21 to close and short circuit the resistance device 19 so that current flowing from the battery to the lamps through solenoid 11 will not serve to insert the resistance 19 in the field circuit which, of course, would tend to prevent the generator from building up at low speed as is desired. Current will also flow from the battery through the solenoid 25 and tend to insert resistance in the lamp or translation circuit and, if the resistance device be properly constructed and the spring 26 properly adjusted, the resistance 7 will be inserted to bring the translation current to its normal voltage in case the batteries deliver current at a voltage above the normal. If now the generator is started, the field 13 will build up in a well-known manner and if the switch 3 be closed when the speed of the generator becomes such that its voltage is slightly in excess of that of the battery, current will flow from the generator through main 2, switch 3, to the lamps or translation devices and cut down the amount of current previously supplied by the battery. If the speed then increases, the generator will deliver more current to line until it carries the entire lamp load and a further increase in speed will cause some current to be delivered to the battery which will traverse the coil 10 in reverse direction to that supplied to the lamps by the battery and thus cause the effect of coil 22 to be weakened and the switch 21 to open, breaking the short circuit around the resistance device 19. If then the speed continues to rise, voltage on the generator will rise until a predetermined limit when the solenoid 16 will cause the resistance 15 to be inserted in the field and cut down the excitation of the generator and hold the voltage thereon constant throughout further rises in speed, thus under these conditions giving a system of constant voltage regulation upon the generator through the instrumentality of solenoid 16 and resistance device 15 and a system of constant voltage upon the lamps or translation circuit through the instrumentality of solenoid 25 and resistance device 7 and; if a proper voltage be chosen for the regulation of the generator the batteries; under certain conditions, will take about their normal charging rate at the beginning and if supplied with current until they become charged, they will gradually rise in voltage to equal that of the generator when they will take no further charging current. If, however, the condition of the battery should be such that the voltage for which the solenoid 16 and resistance 15 shall be set to act to hold constant would cause more than a predetermined charging rate to be delivered to the battery, the solenoid 11 will act to insert the resistance 19 and cut down the current output of the generator in such manner that a current greater than that for which the solenoid 11, and resistance 19 are adjusted cannot be delivered to the battery and the generator would then be regulated as a constant current machine delivering a constant current to the battery until it has raised the voltage upon the same to that at which the solenoid 16 is adjusted to act, when further increase in battery voltage will cause the resistance 15 to be inserted to hold the generator voltage practically constant and the current output to the battery will gradually fall until the voltage upon the storage battery shall reach that at which the solenoid 16 is set to act when little or no current will be delivered to the battery. Now, if the generator is slowed down until it shall be supplying practically no current to the battery or translation devices and the switch 3 be opened, the load will again be taken up by the battery 4 and the switch 21 closed so as to short circuit the resistance 19 and allow the generator to pick up at a low speed as above described and the above operation will be practically repeated upon another increase in speed, etc.

I do not wish to limit myself to the details of construction nor to the exact mode of operation herein given to illustrate one type of system embodying the essentials of my invention, for it will be obvious that wide departure in the way of details may be made without departing from the spirit and scope of my invention which is as set forth in the following claims:—

1. The combination with a generator and a storage battery charged thereby, of a regulator tending to hold the voltage constant, and a regulator tending to hold the current to the battery constant, the latter regulator comprising a variable resistance in series with the field, a relay in shunt to said resistance, and a coil in the battery circuit for operating said relay.

2. The combination with a generator having a field coil, of a storage battery charged thereby, a regulator tending to vary the field so as to hold the voltage constant; a regulator tending to vary the field so as to cut down the voltage when the current flowing into the storage battery shall exceed a predetermined limit, said latter regulator comprising a variable resistance and a coil for operating same in the battery circuit, means responsive to battery current adapted to place said voltage regulating means in control of said generator field.

3. In apparatus of the class described, the combination with a generator and a storage battery charged thereby, of regulating means comprising a voltage coil and a current coil, each exerting a substantial regulating effect throughout a substantial portion of the charging of said battery, and means actuated by battery current adapted to cause a preponderating regulating effect of the voltage coil upon the battery approaching full charge.

4. In apparatus of the class described, the combination with a generator and a storage battery charged thereby, of regulating means comprising a voltage coil and a current coil each exerting a substantial regulating effect throughout the earlier stages of the charge of said battery, and means actuated by battery current adapted to cause a preponderating regulating effect of the voltage coil upon the battery approaching full charge.

5. The combination with a generator and a storage battery charged thereby; of a regulator tending to hold the voltage constant; and a regulator tending to hold the current to the battery constant, the latter regulator comprising a variable resistance in series with the field; a switch in shunt to said resistance; and coils in the battery circuit for operating the resistance and switch respectively.

6. In apparatus of the class described, the combination with a generator and a storage battery charged thereby, of regulating means comprising a voltage coil and a battery current coil each exerting a substantial regulating effect throughout a substantial portion of the charging of said battery, and means actuated by battery current adapted to cause a preponderating regulating effect of the voltage coil upon the battery approaching full charge.

7. The combination with a generator having a field coil; of a storage battery charged thereby; a regulator tending to vary the field so as to hold the voltage constant; a regulator tending to vary the field so as to cut down the voltage when the current flowing to the storage battery shall exceed a predetermined limit, said latter regulator comprising a variable resistance; an electromagnet for controlling said resistance; and a coil in the battery circuit for controlling the operation of the electromagnet.

JOHN L. CREVELING.

Witnesses:
ANNA M. WALL,
ISADORE FINKLER.

Copies of this patent may be obtained for five cents each, by addressing the "Commissioner of Patents, Washington, D. C."